July 9, 1929. A. C. FISCHER Re. 17,369

CONSTRUCTIONAL MATERIAL

Original Filed Sept. 6, 1921

Inventor:
Albert C. Fischer
By [illegible]

Reissued July 9, 1929. Re. 17,369

UNITED STATES PATENT OFFICE.

ALBERT C. FISCHER, OF CHICAGO, ILLINOIS, ASSIGNOR TO THE PHILIP CAREY MANUFACTURING COMPANY, A CORPORATION OF OHIO.

CONSTRUCTIONAL MATERIAL.

Original No. 1,591,670, dated July 6, 1926, Serial No. 498,863, filed September 6, 1921. Application for reissue filed August 26, 1926. Serial No. 131,796.

The present invention relates to constructional material of sponge-like cellular character, and particularly pertains to such articles as expansion joint, rail filler, and waterproof protection course employed in paving construction.

Figures 1, 2 and 3 represent apparatus used in three different methods of producing the material embodying the invention; and Figure 1[a] illustrates a mass of such material.

Figures 4 and 5 represent, in transverse section, expansion joint material having a cellular interior and an impervious or solid exterior. The cellular interior being a body of bituminous material and the impervious or solid exterior being a body of harder bituminous material than said first mentioned body. In other words, the harder bituminous body reinforces the first named body and has a penetration less than that of the first named body.

Figure 1:
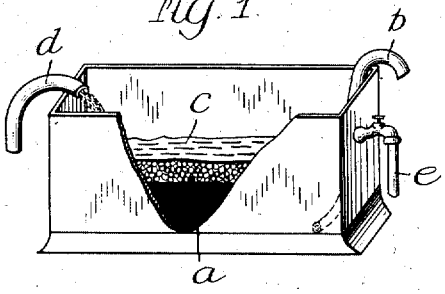

This invention is a continuation in part of my application Serial No. 335,170, filed November 1, 1919, and relates to an asphaltic or bituminous, sponge-like, cellular structure, the cells remaining mostly in an unbroken state. The asphaltic or bituminous structure may comprise sponge asphalt in which fibrous material is incorporated to reenforce the cells or it may comprise dense asphalt in which an air-pocketing ingredient is incorporated to provide the cells. By an air-pocketing ingredient, I mean any ingredient having pores or cells therein or is capable of creating pores or cells in which air can be retained within the bituminous mass to provide air pockets therein and impart resiliency thereto. One method relates to the treatment of vegetable fibers so that the capillary action may be increased, the treatment comprising first degumming the fibers and then saturating them with the binder so that air cells may be permitted to remain within the mass. Where compositions as above described are formed under pressure, they become more dense, and more resilient and resistant to pressure and shock. The heated air in the cells or pores at first expanded upon cooling, is condensed and permits compression of the cellular mass to a more dense body.

The joint may be formed into a cellular spongelike mass under any suitable air trapping conditions. This may be accomplished by directing air thru the heated mass so the bubbles accumulate against a cold surface. By chemical action under pressure, wherein various chemicals are compounded, using bituminous material as the base or bulk, the same cellular structure can be obtained. Bicarbonate of soda, Glauber's salts, sulphur, lime and various chemicals may be used in varying proportions to accomplish the object desired.

A mass of bituminous matter may be mixed with a fibrous substance to strengthen it, suitably filled or charged with air cells, and while in this condition suddenly chilled or immersed in cold water.

Another method by which the air trapping conditions may be effected is to prepare a substance to increase its capillary action, and then immerse the body in heated bituminous matter, and allowing the body to absorb and draw the heated bituminous matter thru its structure, thereby forming a bituminous wall about its numerous air pockets, and creating a sprongy cellular mass, readily compressed and of a resilient spongelike character.

It is readily understood from the foregoing description that the bituminous substance used may be chemically treated, air blown, fibrated and otherwise treated to secure toughness and rubbery consistency. Chemical treatment would naturally involve many chemicals used in the treatment of rubber, sponge rubber and its preparation for vulcanization—so I do not wish to be limited to the nature, body structure or chemical contents of the asphalt or other bituminous material. Examples of suitable chemicals are rubber ($C_{10}H_{16}$), reclaimed rubber, sulphur chloride, zinc chloride, sulphur, and the like. Vegetable oils may also enter into such a structure if properly treated, especially for the manufacture of expansion joints. Earthy matter is sometimes used to secure greater stiffness and check the inherent flow tendency and adhesiveness. By air blown bituminous material, I mean a bituminous residue which has been treated and toughened by the air blowing process. By fibrated, I mean reenforced fibers which may be incorporated in a bituminous binder in a row or degummed condition to reenforce and toughen same.

This cellular structure differs greatly from that shown in previous inventions, in that the air pockets are closed and sealed.

Where solid bituminous matter has been used under pressure, for instance, the pressure upon it of adjoining paving sections incident to its use as a paving joint, there is an elongation or lengthening of the mass and an oozing out from the packed space, which conclusively shows that the body is not inherently compressible. Likewise with laminated joints where the felt has been saturated and squeezed between rollers, then laid together with a solid asphalt layer there is no inherent compressibility.

Where hemp, rope, and other packing materials are used they are immersed in a light waterproofing material or solidly saturated so no cellular structure exists, as herein described. Under pressure most of the joints ooze out of the crevice and lay over on the pavement, thus preventing the substance reentering the crevice.

By inherently compressible paving joint, I mean one which can be compacted into a lesser space without elongation or displacement of its contained bituminous matter or equivalent waterproofing and air pocketing ingredient. Such a joint is caused to adhere to the faces of the opposing pavement slabs, and its expansion in response to contraction of the slabs is more real and rapid than is possible with a solid or boardlike structure.

Upon motion of the opposing slabs or impact, the cellular nature of the structure causes it to conform itself to the changed conditions, whereas a solid structure is sometimes lifted bodily from the crevice.

One of the advantages of this joint is the fact that metal stakes can be driven through the joints very readily, holding same in place until concrete is poured on either side, then later removed. This obviates the necessity of special forms and side staking. The rigidity is produced by the staking and much labor is saved and movement of the joint prevented after it is once staked in position.

The bituminous cellular material herein described should preferably be of a very stiff and tough structure and contain considerable earthy matter to prevent adhesion of the cell walls. One good medium thru which the air can be trapped in pockets is by utilizing a matted, laminated, cellular flax structure, or one of hemp, flax and straw, which have been treated with caustic soda, thus removing the gummy matter in the straw, flax or other vegetable fibre, thus increasing its capillary action.

Figure 2:
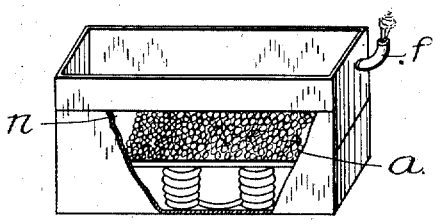

My invention is further illustrated by referring to the accompanying drawings in which Figure 1 illustrates a simple method of trapping bituminous air cells, *a*— represents the heated material —*b*— the air tube supplying the air bubbles —*c*— a cold water layer causing a thick over skin against which the cells can form —*d*— water supply for constantly supplying fresh cold water —*e*— water overflow. Figure 1ª illustrates the herein described cellular structure, Figure 2 illustrates how cells may be formed in toughened bituminous matter under pressure —*a*— representing the bituminous material, —*n*— the casing —*f*— the air vent.

Figure 3:
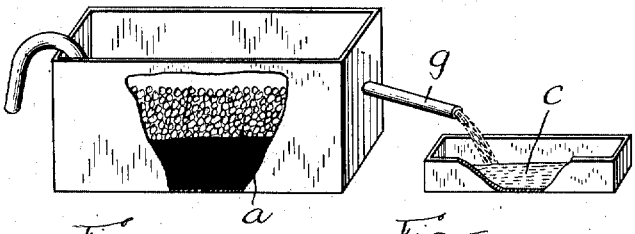
Figure 1A:
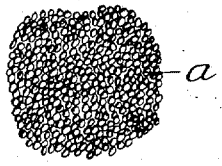

Figure 3 represents the heated material in a bubbling or foaming state, being ejected into a water bath for rapid cooling, —*a*— representing the heated material, —*g*— the outlet pipe, —*e*— the water bath.

Figure 4:
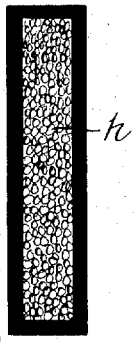

Figure 4 represents a cross-section of expansion joint formed of a body of spongelike bituminous material —*h*— and a body of harder bituminous material than said first mentioned body forming a surface for said joint.

Figure 5:
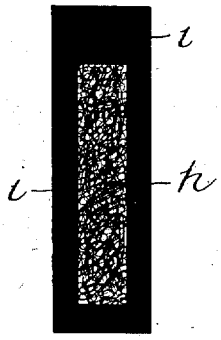

Figure 5 represents a similar construction, but in which the body of spongelike bituminous material is mixed with fibrous material and in which a heavier body of harder bituminous material than said first mentioned body is provided as at —*i*— to form a surface for said joint.

Figure 6:
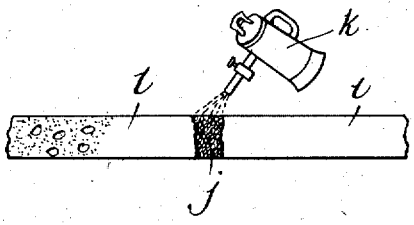
Figure 6 represents a method of providing an impervious or solid skin upon the exposed portion of an expansion joint when in place between two paving blocks.

Figure 6 illustrates a section of sponge asphalt —*j*— being treated with a torch —*k*— to cause an imperforate skin and flow so as to seal the joint in the pavement —*l*—.

Figure 7:
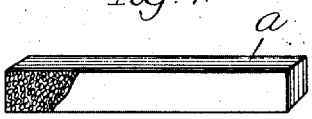
Figure 7 is a perspective view, partly in section, of an expansion joint member adapted for use in the situation suggested in Figure 6.

Figure 7 illustrates a strip of cellular asphalt for caulking purposes.

Figure 8:
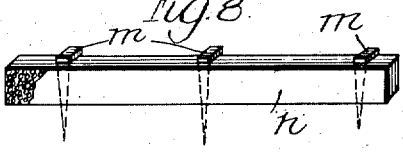
Figure 8 illustrates the use of the member shown in Figure 7 as a molding or defining partition against which plastic paving material can be molded.

Figure 8 illustrates a section of sponge asphalt —*h*— staked with metal pins —*m*— driven thru its cellular structure.

Figure 9:
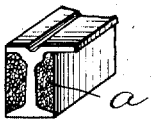
Figures 9 and 10 show two other applications of the material of the invention.

Figure 9 illustrates the herein described spongelike asphalt laid adjacent to car rails for both deadening and expansion purposes.

Figure 10:
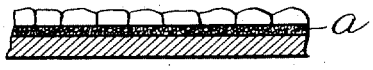

Figure 10 illustrates a sheet of the herein described spongelike bituminous matter, used as a waterproof cushion between the base course and an overlying brick course.

Referring more particularly to Figures 1ª and 4 to 10, *a* represents a sponge-like cellular body of asphaltic material, procured by one of the methods suggested in Figures 1, 2, and 3, or in some other suitable method.

Figures 4 and 5 represent a cross section of an expansion joint, the body of which being of spongelike bituminous material —*h*— and a harder bituminous material —*i*— than said first mentioned body forming a surface for the said joint. In Figure 5 the spongelike bituminous body —*h*— is mixed with fibrous material, and while both bodies of harder bituminous material in both figures are solid the thickness of the same in Figure 5 is somewhat greater, and particularly at the crown of the joint.

In the case of a matted, fibrous mass prepared so as to encourage capillary action the same may be enclosed in walls of harder bituminous material after being saturated to develop the cellular structure referred to.

This packing joint may be used as suggested in Figure 6, where *e*, *e*, represent two adjoining slabs of concrete paving and *j* represents a joint formed between them by the material constituting the subject-matter of the present invention. The material may also be in the form shown in Figure 7, where it is of approximately square section, in which form it will be particularly adapted for use for calking purposes. It may also be used as shown in Figure 8 as a molding wall for concrete pavements by driving spikes —*m*— through the joint until the plastic is poured on either side, after which the spikes can be withdrawn and the holes filled up with liquid bituminous material. The bar —*a*— of packing material is also adapted for use alongside of railway rails, as suggested at —*a*— in Figure 9, and it may also be used in the situation indicated by —*a*— in Figure 10, as a waterproofing layer between a foundation beneath it and a course of building material laid above it.

I claim:

1. Bituminous construction material comprising a spongelike cellular structure, having fibrous material incorporated therewith for reinforcing the cells of said structure.

2. Construction material consisting of bituminous material, the interior portion of which has a sponge-like cellular structure with fibrous material incorporated therein for reinforcing the cells of said structure, and the exterior comprising a solid wall enclosing said interior portion.

3. Construction material consisting of bituminous material, the interior portion of which has a sponge-like structure, and the exterior constitutes a solid wall enclosing said interior portion.

4. Construction material comprising a spongelike cellular body of bituminous material with solid enveloping walls, and sustaining spikes driven through the same and sustaining it in position to serve as a molding wall.

5. Bituminous construction material comprising a body of bituminous material having cells provided therein, earthy material mixed with the bituminous material to prevent adhesion of the cell walls, and fibrous material incorporated therein for reenforcing the body.

6. In an expansion joint, a body of bituminous material of sponge-like, cellular structure, earthy material mixed with the bituminous material to prevent adhesion of the cell walls, and fibrous material incorporated therein for reenforcing the body.

7. Preformed construction units comprising a homogeneous composition of bituminous compound, an air-pocketing ingredient, and reenforcing elements.

8. Preformed construction units comprising a homogeneous composition of bituminous substance of cellular structure and an earthy material, said earthy material being contained within the cellular structure to prevent adhesion of the cell walls.

9. Preformed construction units, comprising a homogeneous composition of bituminous compound, an air-pocketing ingredient, and reenforcing elements, said preformed units having an imperforated wall covering.

10. Preformed construction units comprising a homogeneous composition of bituminous substance of cellular structure, an earthy material to prevent adhesion of the cell walls and an imperforate wall covering.

11. Preformed expansion joint strips, comprising a homogeneous composition of bituminous compound, an air-pocketing ingredient, and reenforcing elements.

12. Preformed expansion joint strips, comprising a homogeneous composition of bituminous substance of cellular structure and an earthy ingredient which separates the cell walls of the cellular structure.

Signed at Petoskey, Mich., this 23rd day of Aug., 1926.

ALBERT C. FISCHER.